US012794563B2

(12) United States Patent
Iqbal et al.

(10) Patent No.: US 12,794,563 B2
(45) Date of Patent: Nov. 10, 2026

(54) OPTICAL RECEIVER

(71) Applicant: HUAWEI TECHNOLOGIES CO., LTD., Shenzhen (CN)

(72) Inventors: Ahmer Iqbal, Cambridge (GB); Lei Jing, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 184 days.

(21) Appl. No.: 18/916,560

(22) Filed: Oct. 15, 2024

(65) Prior Publication Data

US 2025/0038861 A1 Jan. 30, 2025

Related U.S. Application Data

(63) Continuation of application No. PCT/CN2023/087169, filed on Apr. 8, 2023.

(30) Foreign Application Priority Data

Apr. 15, 2022 (CN) ........................ 202210399439.0

(51) Int. Cl.
*H04B 10/60* (2013.01)
*H04B 10/69* (2013.01)
*H04B 10/66* (2013.01)

(52) U.S. Cl.
CPC ..... *H04B 10/6931* (2013.01); *H04B 10/6911* (2013.01); *H04B 10/60* (2013.01);
(Continued)

(58) Field of Classification Search
CPC ............ H04B 10/6931; H04B 10/6911; H04B 10/60; H04B 10/66; H04B 10/69;
(Continued)

(56) References Cited

U.S. PATENT DOCUMENTS 5,801,588 A * 9/1998 Nishiyama .............. H03F 3/082 250/214 AG
8,537,941 B1 * 9/2013 French ................. H03G 3/3084 375/147

(Continued)

FOREIGN PATENT DOCUMENTS

CN 114050793 A 2/2022

OTHER PUBLICATIONS

Shekhar et al: "Bandwidth Extension Techniques for CMOS Amplifiers", IEEE Journal of Solid-State Circuits, IEEE, USA, vol. 41, No. 11, Nov. 1, 2006 (Nov. 1, 2006), pp. 2424-2439, XP011149841.

*Primary Examiner* — Dibson J Sanchez

(57) ABSTRACT

This application relates to an optical receiver. The optical receiver includes a photodiode, a trans-impedance amplifying unit, a control unit, and one or more automatic gain controllers. The control unit includes one or more control subunits. The control subunit includes one or more inductors, and a field-effect transistor coupled in parallel to the one or more inductors. An input end of each automatic gain controller is coupled to an output end of a corresponding control subunit, and an output end of the automatic gain controller is coupled to a gate of a field-effect transistor included in the corresponding control subunit. The automatic gain controller is configured to output a voltage signal to the gate of the field-effect transistor, where the output voltage signal is used to change a current conduction capability of the field-effect transistor.

20 Claims, 11 Drawing Sheets

(52) U.S. Cl.
CPC .............. *H04B 10/66* (2013.01); *H04B 10/69* (2013.01); *H04B 10/693* (2013.01)

(58) Field of Classification Search
CPC ....... H04B 10/693; H03F 1/565; H03F 3/087; H03G 3/3084
USPC .................................................. 398/202–214
See application file for complete search history.

(56) References Cited

U.S. PATENT DOCUMENTS 9,590,801 B1 * 3/2017 Shringarpure ....... H04B 10/693
9,866,184 B1 * 1/2018 Lee ..................... H03F 3/45475
10,797,658 B1 * 10/2020 Raj ......................... H03F 1/342
2003/0161640 A1 * 8/2003 Kimura .............. H04B 10/6931 398/202
2004/0247327 A1 * 12/2004 Kamali .............. H04B 10/6931 398/202
2007/0201881 A1 * 8/2007 Douma ................ G02B 6/4246 257/E31.118
2009/0245807 A1 * 10/2009 Nomura ............. H04B 10/6931 359/333
2011/0311232 A1 * 12/2011 Morita ............... H04B 10/6973 398/141
2012/0070121 A1 * 3/2012 Ito ........................... H03F 3/087 385/88
2013/0120059 A1 * 5/2013 Oku .......................... H03F 1/52 330/75
2013/0335145 A1 * 12/2013 Huang ................ H03F 3/45183 330/260
2014/0159815 A1 * 6/2014 Cai ........................... H03F 1/42 330/260
2014/0193164 A1 * 7/2014 Ide ..................... H04B 10/6933 398/210
2014/0367557 A1 * 12/2014 Ueno ........................ H03F 3/08 250/214 A
2015/0086221 A1 * 3/2015 Shringarpure ........ H03F 1/0205 359/344
2016/0261246 A1 * 9/2016 Koizumi ............. H03F 3/45744
2016/0344359 A1 * 11/2016 MacDonald ........... H03G 3/001
2018/0145644 A1 5/2018 Broekaert
2019/0319594 A1 * 10/2019 Nakayama ................ H03F 3/08
2019/0334482 A1 * 10/2019 Bayruns .................... G01J 1/46
2020/0145114 A1 5/2020 Tatsumi
2021/0167863 A1 * 6/2021 Sugimoto ........... H03F 3/45475
2022/0057262 A1 * 2/2022 Kumagai .................. H03F 3/08
2022/0182031 A1 * 6/2022 Ugolini ................... H03F 1/086
2023/0011340 A1 * 1/2023 Kumagai ............... H04B 10/60

* cited by examiner

OPTICAL RECEIVER

CROSS-REFERENCE TO RELATED APPLICATIONS

This application is a continuation of International Application No. PCT/CN2023/087169, filed on Apr. 8, 2023, which claims priority to Chinese Patent Application No. 202210399439.0, filed on Apr. 15, 2022. The disclosures of the aforementioned applications are hereby incorporated by reference in their entireties.

TECHNICAL FIELD

This application relates to the field of optical communication technologies, and in particular, to an optical receiver.

BACKGROUND

The market for 10 gigabit per second passive optical network (10G PON) is expanding by virtue of its high rate and other advantages. In 10G PON or a network with a higher rate, or other optical communication networks, how to reduce costs of optical components without performance degrading is a research hotspot in the industry.

Currently in the 10G PON field, an avalanche photon diode (APD) is generally used as a receiving front end of an optical communication device to achieve better performance. However, the APD has complex process and high costs.

SUMMARY

Embodiments of this application provide an optical receiver to provide a technical solution that is based on a cost-effective photodetector and that can ensure performance of the optical receiver.

According to a first aspect, an optical receiver is provided. The optical receiver may include at least a photodiode, a trans-impedance amplifying unit, a control unit, and one or more automatic gain controllers. The control unit may include at least one or more control subunits. The control subunit may include at least one or more inductors, and a field-effect transistor coupled in parallel to the one or more inductors. The trans-impedance amplifying unit and the control unit may be coupled in series to form a first branch circuit. An input end of the first branch circuit receives an output signal from the photodiode. An input end of each automatic gain controller is coupled to an output end of a corresponding control subunit, and an output end of the automatic gain controller is coupled to a gate of a field-effect transistor included in the corresponding control subunit. The automatic gain controller is configured to output a voltage signal to the gate of the field-effect transistor, where the output voltage signal is used to change a current conduction capability of the field-effect transistor.

In the optical receiver, the field-effect transistor is coupled in parallel to the inductor included in the optical receiver. In addition, the gate of the field-effect transistor receives the output voltage signal from the automatic gain controller, so that the field-effect transistor has different current conduction capabilities in the case of receiving different output voltage signals. Therefore, according to the optical receiver provided in this application, when an input signal received by the inductor increases, a gate voltage of the field-effect transistor changes as an output voltage of the automatic gain controller changes, so that a bypass short-circuit effect of the field-effect transistor may be caused when the gate voltage reaches a signal threshold. In other words, drain-source resistance of the field-effect transistor can be reduced. In this way, the drain-source resistance of the field-effect transistor is reduced in a high input signal scenario of the field-effect transistor, so that signal deterioration or other problems potentially existing in the optical receiver can be alleviated, and a ringing phenomenon/oscillation phenomenon potentially occurring in a signal transmission process can be reduced or avoided.

In a design, that the input end of the first branch circuit receives the output signal from the photodiode, and an output end of the first branch circuit is coupled to an output end of the optical receiver may be: an input end of the trans-impedance amplifying unit receives the output signal from the photodiode and transmits the signal to the control unit, where an output end of the control unit is coupled to the output end of the optical receiver; or an input end of the control unit receives the output signal from the photodiode and transmits the signal to the trans-impedance amplifying unit, where an output end of the trans-impedance amplifying unit is coupled to the output end of the optical receiver. It may be understood that a coupling sequence between the trans-impedance amplifying unit and other elements after the trans-impedance amplifying unit and the control unit are coupled in series is not limited in the optical receiver provided in this application.

In this design, the inductor included in the optical receiver may increase a bandwidth of an electrical signal, and the trans-impedance amplifying unit included in the optical receiver may amplify the electrical signal. A sequence of increasing a bandwidth and amplifying a signal is not limited in the optical receiver provided in this application, and may be set based on an actual application scenario.

In a design, that an input end of each automatic gain controller is coupled to an output end of a corresponding control subunit includes the following scenarios. (1) If the input end of the trans-impedance amplifying unit receives the output signal from the photodiode, the input end of the automatic gain controller is coupled to the output end of the corresponding control subunit. In other words, in the optical receiver, the trans-impedance amplifying unit is disposed before the control unit. (2) If the input end of the control unit receives the output signal from the photodiode, the input end of the automatic gain controller is coupled to the output end of the corresponding control subunit; or the input end of the automatic gain controller is coupled to the output end of the corresponding control subunit through the trans-impedance amplifying unit. In other words, in the optical receiver, the trans-impedance amplifying unit is disposed behind the control unit.

In this design, the input end of the automatic gain controller obtains a signal of any node behind the output end of the control subunit to be controlled, so that a signal peak of the control subunit to be controlled can be automatically adjusted to avoid an excessive peak resulting from resonance of the inductor. Therefore, the receiving performance of the optical receiver can be ensured.

In a design, the optical receiver may further include a second branch circuit, and the second branch circuit may include one or a combination of the following components: one or more amplifying units, and one or more buffer units. That an output end of the first branch circuit is coupled to an output end of the optical receiver includes: the output end of the first branch circuit is coupled to the output end of the optical receiver through the second branch circuit. That an input end of each automatic gain controller is coupled to an output end of a corresponding control subunit includes: the input end of the automatic gain controller is coupled to the output end of the corresponding control subunit through one or more of the amplifying units or the buffer units included in the second branch circuit.

In this design, if the optical receiver further includes one or more other elements, the input end of the automatic gain controller may also obtain a signal of any node behind the output end of the control subunit to be controlled, so that a signal peak of the control subunit to be controlled can be automatically adjusted, to avoid an excessive peak resulting from resonance of the inductor. Therefore, receiving performance of the optical receiver can be ensured.

In a design, if the control unit includes a first control subunit, one or more inductors included in the first control subunit are coupled on a transmission link between an output end of the photodiode and the output end of the optical receiver; or one or more inductors included in the first control subunit are coupled inside any one of the amplifying units or any one of the buffer units. It may be understood that, in the optical receiver provided in this application, a manner of coupling the control subunit in the optical receiver is not limited.

In a design, if the field-effect transistor is an N-channel field-effect transistor, a current conduction capability of the N-channel field-effect transistor is negatively correlated with an output voltage signal of the automatic gain controller; or if the field-effect transistor is a P-channel field-effect transistor and the automatic gain controller further includes a phase inverter, a current conduction capability of the P-channel field-effect transistor is positively correlated with an output voltage signal of the automatic gain controller.

In this design, based on features of different types of field-effect transistors, the field-effect transistors can be adaptively used in the optical receiver to serve as parallel variable impedance of the inductor; in other words, the field-effect transistors can alter a current conduction capability. Therefore, automatic adjustment of a signal peak in the optical receiver can be implemented to avoid an excessive peak caused by resonance of the inductor, so as to ensure receiving performance of the optical receiver.

In a design, the automatic gain controller receives a single-end signal or a differential signal from any node behind the output end of the corresponding control subunit.

In a design, if the control unit includes a plurality of control subunits, a quantity of inductors included in a first control subunit is the same as or different from a quantity of inductors included in a second control subunit, where the first control subunit and the second control subunit are any two of the plurality of control subunits.

In a design, different automatic gain controllers correspond to different control subunits, or different automatic gain controllers correspond to a same control subunit. In this design, a plurality of automatic gain controllers may respectively control the control subunits, or may jointly control a control subunit, so that different automatic gain controllers can be adapted to the control subunit in different scenarios to improve adjustment accuracy for the control subunit.

In a design, if different automatic gain controllers correspond to a same control subunit, input ends of the different automatic gain controllers are respectively coupled to different node locations behind an output end of the same control subunit. In this design, different automatic gain controllers may obtain different voltages of different nodes on a signal path behind the control subunit to be controlled, to implement more accurate peak adjustment and control on the control subunit based on signal features of the different nodes.

In a design, an output end of at least one automatic gain controller is further coupled to the input end of the trans-impedance amplifying unit, where the automatic gain controller is further configured to adjust a trans-impedance gain of the trans-impedance amplifying unit. In this design, in the optical receiver provided in this application, an implementation of adjusting the current conduction capability of the field-effect transistor may be: reusing the automatic gain controller that is in the optical receiver and that adjusts the gain of the trans-impedance amplifying unit, or adding an independent automatic gain controller.

In a design, the plurality of control subunits are coupled in series.

In a design, the output end of the first branch circuit is coupled to the output end of the optical receiver. Optionally, the output end of the first branch circuit may be directly coupled to the output end of the optical receiver. Optionally, the output end of the first branch circuit may be indirectly coupled to the output end of the optical receiver through one or more other elements.

According to a second aspect, an embodiment of this application further provides an optical communication device, which may include the optical receiver described in any one of the first aspect or any one of the designs of the first aspect and one or more processors. The one or more processors are configured to receive and process a data packet transmitted from the optical receiver.

The optical communication device in the second aspect includes the optical receiver in the designs of the first aspect, and therefore also has the technical effects achievable by the designs of the first aspect. Details are not described herein again.

DESCRIPTION OF EMBODIMENTS

The following describes technical solutions in embodiments of this application in detail with reference to the accompanying drawings in embodiments of this application.

An optical receiver provided in embodiments of this application may be used in an optical communication system, and the optical communication system may be a PON system. The PON system is a point 2 multipoint (P2MP)-based communication technology. For example, the PON system may be an ethernet passive optical network (EPON) system, a gigabit-capable passive optical network (GPON) system, a wavelength division multiplexing passive optical network (WDM PON) system, or an asynchronous transfer mode passive optical network (APON) system.

Figure 1:
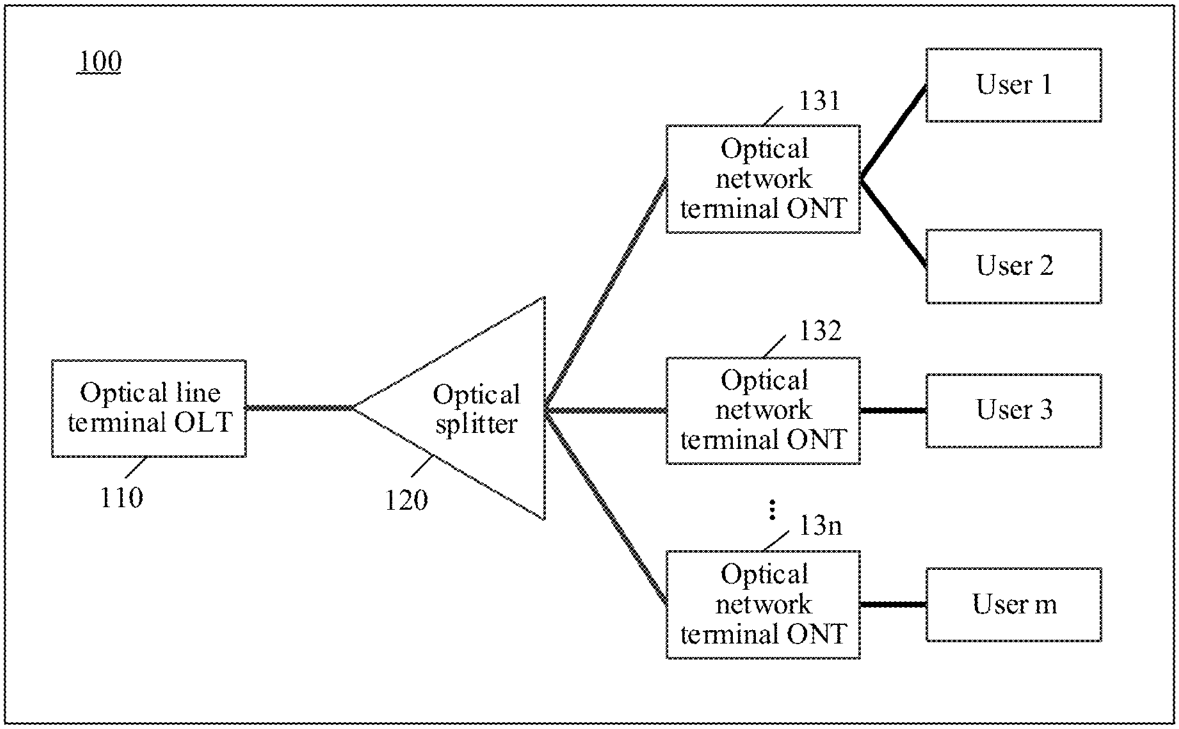
FIG. 1 is a diagram of a scenario of an optical communication system.

In an example application scenario, FIG. 1 is a diagram of some scenarios of an optical communication system. The PON system 100 may include at least one or more optical network terminals (ONTs) or optical network units (ONUs), and an optical splitter 120. For ease of description, the ONT refers to the ONT or the ONU in this document. If there are a plurality of ONTs, the plurality of ONTs may communicate with an upper-layer access device through the optical splitter 120. The upper-layer access device may be, for example, an optical line termination (OLT) 110. For example, in FIG. 1, the plurality of ONTs included in the PON system 100 may be an ONT 131, an ONT 132, . . . , and an ONT 13*n*. Each ONT may be connected to a plurality of users. For example, the ONT 131 may be connected to a user 1 and a user 2. Alternatively, the ONT may be connected to one user. For example, the ONT 132 may be connected to a user 3, and the ONT 13*n* may be connected to a user m. In this way, the OLT 110 may provide a network side interface for the PON system 100. The ONT may be used as a terminal device on a user side in the optical communication system, may provide a service interface for a user, and has an electrical-optical conversion function to implement a signal conversion process between the user and an access network.

With reference to the content described in the background, an APD is usually used as a receiving front end of an optical communication device (for example, an ONT, an OLT, or an optical processing device or optical transmission device in another optical communication system) because the APD has a multiplier layer to achieve better receiving performance. However, the APD can be complex and costs high in process. Therefore, how to reduce costs of the optical component without changing performance is a research hotspot in the industry.

In view of this, embodiments of this application provide an optical receiver. It is considered that a photodetector, for example, a photodiode instead of an APD, is used as a receiving front end of an optical communication device. In addition, to ensure a transmission bandwidth of the optical receiver in a signal transmission process, an inductor is coupled in series on a transmission link (or referred to as a "signal path") included in the optical receiver, to implement an inductor-based resonance feature, and increase a signal bandwidth. Moreover, to ensure receiving performance of the optical receiver, a field-effect transistor may be further coupled in parallel at the inductor included in the optical receiver. In addition, a gate of the field-effect transistor receives an output voltage signal of an automatic gain controller, so that the field-effect transistor has different current conduction capabilities when receiving different output voltage signals, to implement peak adjustment on signals that pass through the inductor.

Therefore, according to the optical receiver provided in this application, when an input signal received by the inductor increases, a gate voltage of the field-effect transistor changes with an output voltage of the automatic gain controller, so that a bypass short-circuit effect of the field-effect transistor can be caused when the gate voltage reaches a signal threshold. In other words, according to the optical receiver provided in this application, when an input signal received by the inductor increases, drain-source resistance of the field-effect transistor can be reduced. In this way, the drain-source resistance of the field-effect transistor is reduced in a high input signal scenario of the field-effect transistor, so that a problem such as signal deterioration that may exist in the inductor can be alleviated, and a ringing phenomenon/oscillation phenomenon that may occur in a signal transmission process can be reduced or avoided.

It should be noted that, in comparison with the APD, the photodetector, for example, the photodiode lacks a multiplier layer, and therefore outputs a smaller current signal after performing optical-electrical conversion on an optical signal. In a scenario in which a current that is output by a photodetector through optical-electrical conversion is small, if an optical receiver still needs to achieve good receiving performance (for example, a voltage signal output by the optical receiver usually needs to reach a fixed range), a trans-impedance amplifier included in the optical receiver usually needs to compensate for a larger gain. In this case, when an input signal from the photodetector is large, there may be an excessive signal peak caused by excessively great compensation. This results in greatly reduced performance of the optical receiver. For example, a current, obtained through optical-electrical conversion, of a PIN (mainly including a P region, an N region, and an I-type layer that is generated between the P region and the N region) photodiode is about 8 to 10 times smaller than a current, obtained through optical-electrical conversion, of an APD. To achieve same or similar performance as an optical receiver using the APD, an optical receiver using the PIN photodiode needs to compensate for 8 to 10 times of a gain. In this way, when an input signal is large, a problem such as signal deterioration may be caused. Consequently, the trans-impedance amplifier cannot operate stably, and performance of receiving an optical signal by the optical receiver is reduced.

Figure 2:
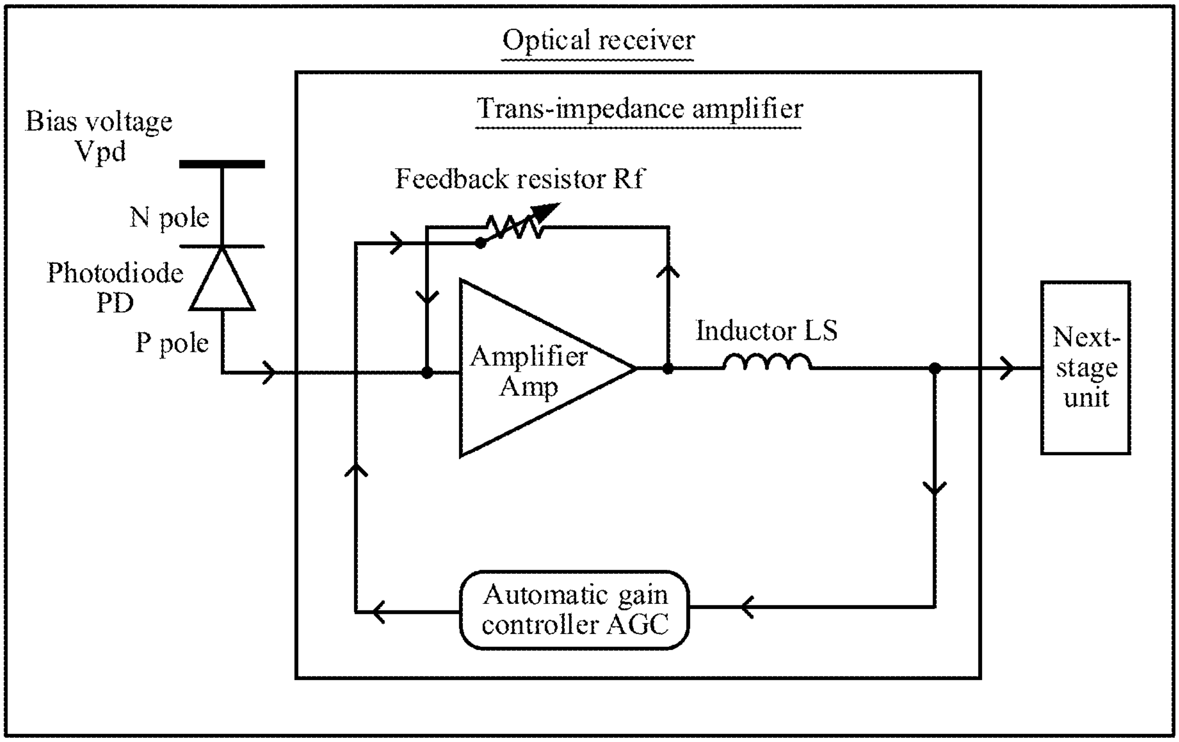
FIG. 2 is a diagram of a structure of an optical receiver.

FIG. 2 is an example diagram of an optical receiver. The optical receiver may be configured to: receive, for an ONT in an optical communication system, an optical signal, and convert the optical signal into an electrical signal, to implement signal transmission. Generally, the optical receiver may include at least a photodetector and a trans-impedance amplifier.

(1) The photodetector is configured to: receive an optical signal, and convert the optical signal into an electrical signal. For example, the photodetector may be a photodiode (PD) in FIG. 2. After a bias voltage (which is denoted by Vpd) is provided for the photodiode, if the provided bias voltage is greater than or equal to a threshold voltage (which is assumed to be denoted by Vth) for normal working of the photodiode, that is, Vpd≥Vth, the photodiode may work normally. Vpd may be provided to the PD via an N pole of the PD, to drive the PD to work normally, and an electrical signal generated after being processed by the PD may be output via a P pole of the PD, for example, transmitted to a next-stage trans-impedance amplifier.

(2) The trans-impedance amplifier (TIA) is mainly configured to amplify a current signal from the photodetector, to convert the current signal into a voltage signal. The TIA may usually include at least a trans-impedance amplifying unit. In the TIA, a current signal may be amplified by the trans-impedance amplifying unit. The trans-impedance amplifying unit may include at least a feedback resistor unit (for example, Rf in FIG.

2) and a preamplifier unit (for example, an amplifier in FIG. 2) that are coupled in parallel.

In addition, to further increase a bandwidth of a signal transmitted in the optical receiver, an inductor (for example, LS in FIG. 2) may be further coupled in series on a signal path. In this way, a bandwidth of an electrical signal can be further increased due to a resonance effect of the inductor on the electrical signal. It should be noted that the inductor may be integrated inside the TIA or may be disposed outside the TIA, where the inductor and the TIA are two parts independent of each other in the optical receiver. This is not limited in this application.

In addition, the TIA may generally further include an automatic gain controller (AGC). The AGC may receive a voltage signal at any node location behind the LS, and adjust a gain and/or feedback resistance in the trans-impedance amplifying unit based on the voltage signal. In addition, it may be understood that the TIA may further include a one-stage or multi-stage buffer unit, and/or another one-stage or multi-stage amplifying unit, which are not shown in FIG. 2.

In the example shown in FIG. 2, after a current signal from the photodiode enters the trans-impedance amplifier, amplification and bandwidth increasing may be performed to obtain a voltage signal. When the optical receiver needs to reach a similar output voltage signal range, if a current signal that is output by the photodiode through optical-electrical conversion is smaller, the trans-impedance amplifying unit in the trans-impedance amplifier needs to provide a larger trans-impedance gain. This may cause a decrease in a transmission bandwidth of an obtained voltage signal, and further increase a bandwidth of an electrical signal through the inductor. It may be understood that when a trans-impedance gain factor provided by the trans-impedance amplifying unit and a bandwidth increase factor provided by the inductor are large, if an input current signal from the photodiode is overloaded, an excessive peak may be caused due to a resonance effect of the inductor, to cause a ringing phenomenon or an oscillation phenomenon of a transmitted signal. As a result, signal transmission is unstable and receiving performance of the optical receiver is greatly reduced. The excessive peak may be understood as that: at some signal frequency locations, if an input current signal is overloaded and resonance further occurs, gains at the frequency locations are very high. This causes an excessive peak.

For ease of understanding, the following describes a working principle of the optical receiver provided in this application with reference to a formula 1 to a formula 3.

$$\frac{\text{Vout}}{Iin} = -\frac{A}{A+1} * \frac{Rf}{1 + \frac{Rf * Cd}{A+1} * S} \quad \text{Formula 1}$$

In the formula 1, Vout may represent an output voltage of the optical receiver; Iin may represent a current signal that is output by the photodetector through optical-electrical conversion; A may represent a gain of the trans-impedance amplifying unit; Rf may represent feedback resistance of the feedback resistor unit; Cd may represent parasitic capacitance of the photodetector; and S may represent an angular frequency, which may be denoted by jw.

$$Iin = P * M * R \quad \text{Formula 2}$$

In the formula 2, P may represent an incident optical power; M may represent a multiplication factor of the photodetector, where for example, for an APD, M is greater than 1 because the APD has a multiplier layer, and for a PD, M=1 because the PD has no multiplier layer; and R may represent responsivity of the photodetector.

It may be obtained according to the foregoing formula 1 and formula 2 that, to make Vout of different types of photodetectors be the same or similar, in a scenario in which Iin output by the photodetector is small, Rf needs to be set to a large value.

Further, the following formula 3 shows a manner of calculating a signal bandwidth of the optical receiver, and the formula 3 is as follows:

$$BW_{3dB} = \frac{1}{2\pi} * \frac{\sqrt{2A(A+1)}}{Rf * Cd} \quad \text{Formula 3}$$

In the formula 3, $BW_{3dB}$ represents a bandwidth of an electrical signal. It may be obtained according to the foregoing formula 3 that, when Iin is small, if Rf is set to a large value, Vout output by the optical receiver may be the same as or similar to Vout output by the optical receiver when Iin is large. However, this also causes a decrease in a signal transmission bandwidth, and further affects signal transmission efficiency of the optical receiver.

Although the APD may have better receiving performance because of having the multiplier layer, there is a problem of high costs. The cost-effective photodiode may be used as the photodetector in the optical receiver provided in this application. However, when the cost-effective photodetector is used as the optical receiver, a problem such as a decrease in a signal transmission bandwidth may be caused. In the optical receiver provided in this application, the inductor may be coupled in series on the signal path, to increase a signal bandwidth. Although the bandwidth may be increased by using the inductor, when an input signal of the trans-impedance amplifier is excessively large, an excessive peak may be caused due to an effect such as resonance of the high-frequency inductor. This causes a signal deterioration problem, and reduces receiving performance of the optical receiver.

Figure 3A:
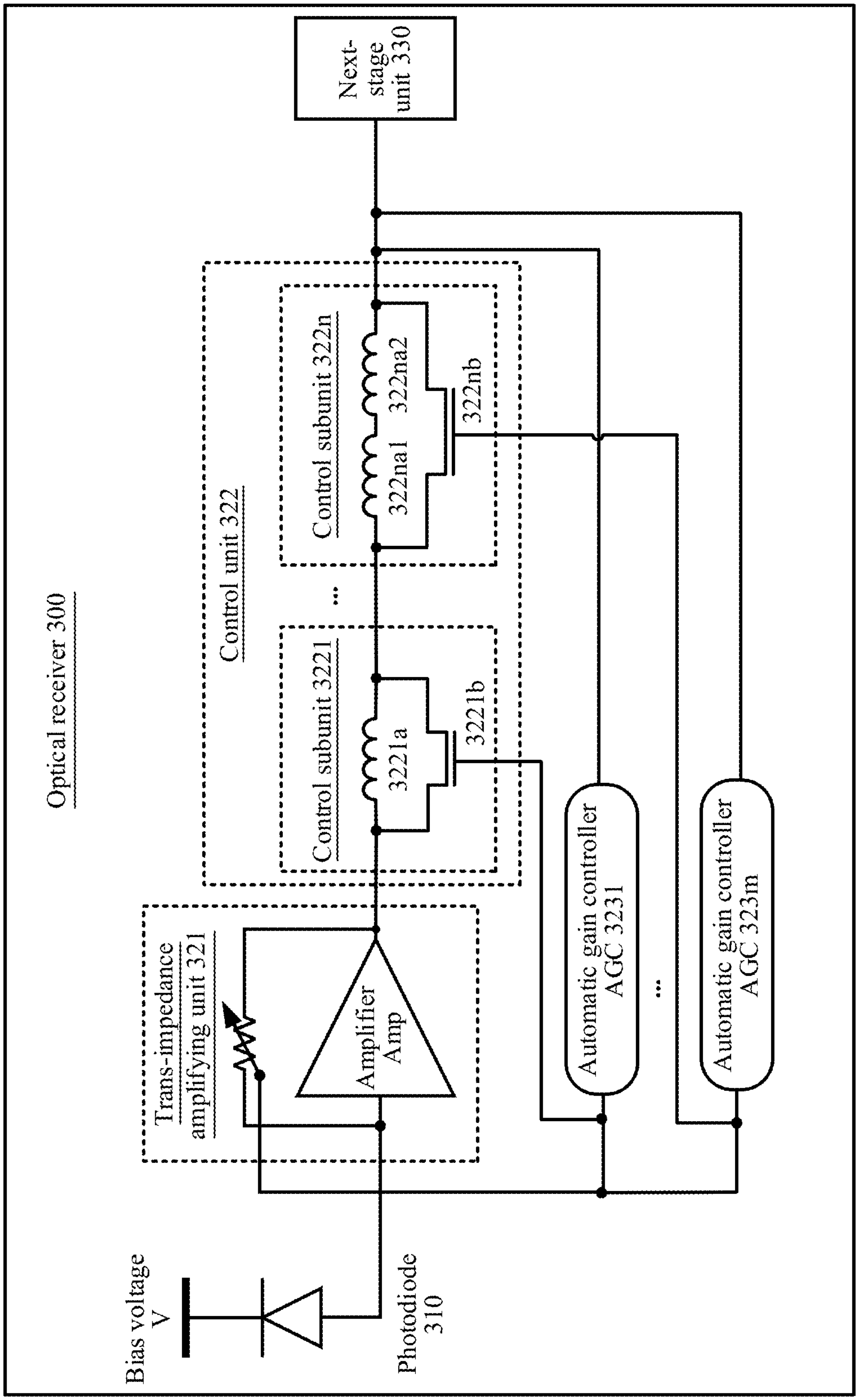
FIG. 3*a* is a diagram of an optical receiver according to an embodiment of this application.

Therefore, in a scenario in which a cost-effective photodetector is used as an optical receiver, to ensure non-deterioration of a signal-to-noise ratio, avoid a decrease in a signal bandwidth of the optical receiver, and the like, embodiments of this application provide an optical receiver so that when an input signal is overloaded, a problem of a high-frequency peak caused based on a high-frequency inductor can be alleviated or avoided. FIG. 3*a* is a diagram of an optical receiver 300 according to an embodiment of this application. The optical receiver 300 provided in this embodiment of this application may include at least the following components.

A. A photodiode 310 configured to: receive an optical signal and convert the optical signal into an electrical signal. For example, the photodiode may be a PIN photodiode (mainly including a P region, an N region, and an I-type layer generated between the P region and the N region) or another type of optical-electrical conversion unit. This is not limited in this application. In addition, the photodiode usually needs a component such as a voltage regulator to provide a bias voltage, so that the photodiode can work normally driven by the bias voltage.

B. A trans-impedance amplifying unit 321, typically including a feedback resistor unit and a preamplifier unit coupled in parallel.

C. A control unit 322, coupled to the trans-impedance amplifying unit 321 in series. It is assumed that the trans-impedance amplifying unit 321 and the control unit 322 are coupled in series to form a first branch circuit. For example, in the optical receiver 300 shown in FIG. 3*a*, an input end of the first branch circuit may receive an output signal from the photodiode 310. An output end of the first branch circuit may be coupled to an output end of the optical receiver 300. Optionally, the output end of the first branch circuit may be directly coupled to the output end of the optical receiver 300. Optionally, the output end of the first branch circuit may alternatively be indirectly coupled to the output end of the optical receiver 300 through a next-stage unit 330 or one or more other elements.

Figure 3B:
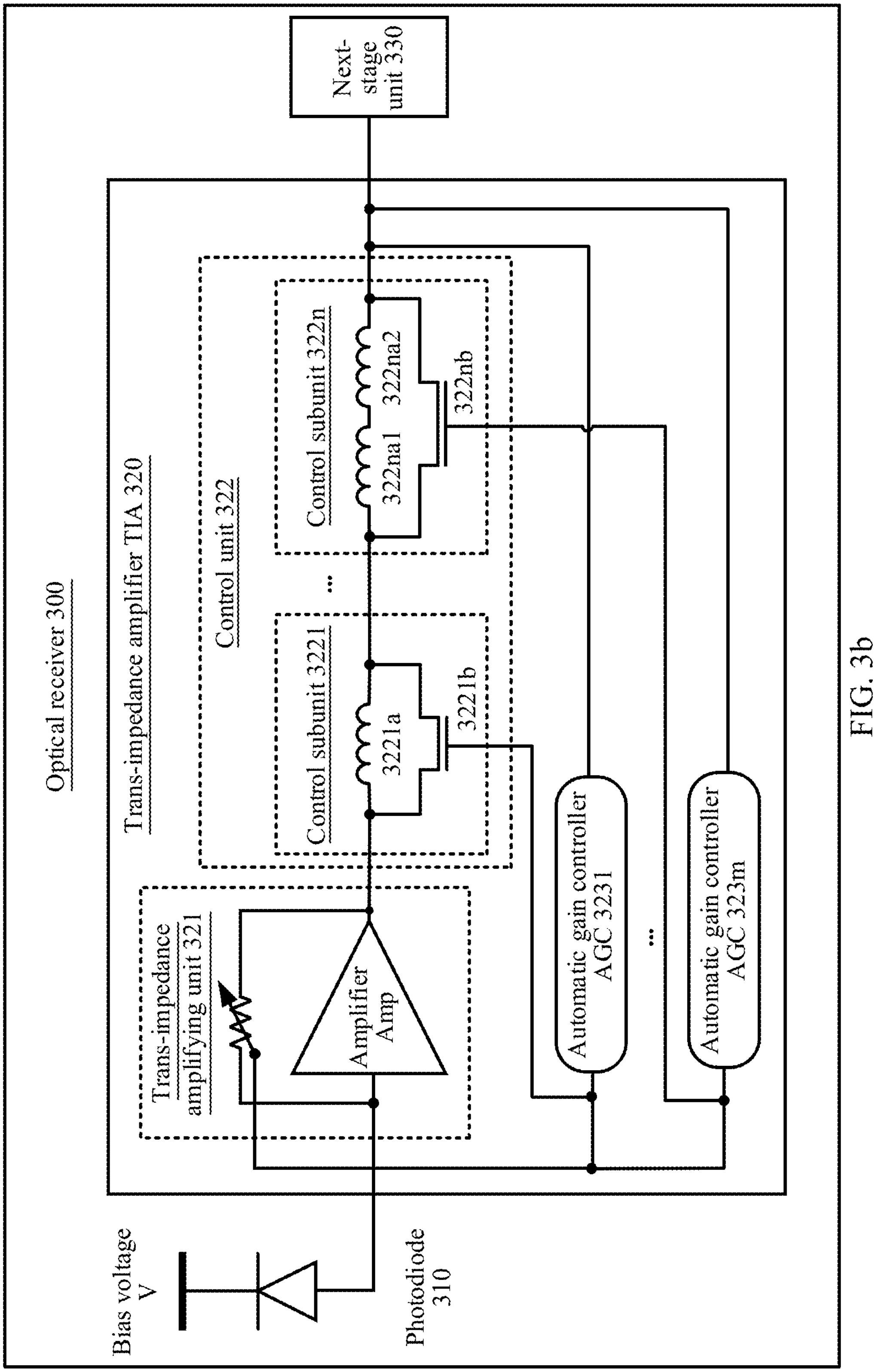
FIG. 3*b* is a first example diagram of an optical receiver according to an embodiment of this application.

For example, as shown in FIG. 3*b*, the control unit 322 may be integrated inside a trans-impedance amplifier 320; or the control unit 322 and a trans-impedance amplifier 320 may be disposed independently. For example, the control unit 322 may be coupled between the photodiode 310 and the trans-impedance amplifier 320. For another example, the control unit 322 may alternatively be coupled between the trans-impedance amplifier 320 and the next-stage unit 330. It should be noted that, in the following embodiments of this application, an example in which the control unit 322 is integrated inside the trans-impedance amplifier 320 is mainly used for description. However, a coupling relationship between the control unit 322 and the trans-impedance amplifier 320 is not limited during implementation of this application.

In addition, it should be noted that a coupling manner of the first branch circuit on a signal path is not limited in the optical receiver 300 provided in embodiments of this application either. In other words, the coupling manner of the first branch circuit may be that an input end of the trans-impedance amplifying unit 321 is coupled to an output end of the photodiode 310, and then an output end of the trans-impedance amplifying unit 321 and an input end of the control unit 322 are coupled in series, as an example shown in FIG. 3*b*. Alternatively, the coupling manner of the first branch circuit may be that an input end of the control unit 322 is coupled to an output end of the photodiode 310, and then an output end of the control unit 322 and an input end of the trans-impedance amplifying unit 321 are coupled in series.

The control unit 322 may include at least one or more control subunits. If there are a plurality of control subunits, the plurality of control subunits may be coupled in a series, for example, a control subunit 3221 to a control subunit 322*n* shown in FIG. 3*b*, where n is a positive integer. Optionally, m may be equal to n, so that each automatic gain controller separately controls different control subunits; m may be less than n, where any automatic gain controller may separately control a plurality of different control subunits; or m may be greater than n, where a plurality of automatic gain controllers may control a same control subunit. This is not limited in this application.

Further, any control subunit may include one or more inductors, and a field-effect transistor coupled in parallel to the one or more inductors. For example, the control subunit 3221 may include an inductor 3221*a* and a semiconductor field-effect transistor 3221*b* coupled in parallel to the inductor 3221*a*. Alternatively, for another example, the control subunit 322*n* may include an inductor 322*na*1, an inductor 322*na*2, and a semiconductor field-effect transistor 322*nb* coupled in parallel to a branch circuit of the inductor $\mathbf{322}_{na}\mathbf{1}$ and the inductor 322*na*2.

Optionally, one or more inductors included in any one of the control subunits may be independently disposed on a transmission link between the output end of the photodiode 310 and the output end of the optical receiver 300. Optionally, if the optical receiver 300 further includes one or more amplifying units/buffer units, one or more inductors included in any one of the control subunits may alternatively be coupled inside any one of the amplifying units or any one of the buffer units. It should be noted that coupling manners of different control subunits may be different. For example, a first control subunit may be coupled on the transmission link, and a second control subunit may be coupled inside the amplifying unit/buffer unit. This is not limited in this application.

In addition, if the control unit 322 includes a plurality of control subunits, a quantity of inductors included in the first control subunit may be the same as or different from a quantity of inductors included in the second control subunit. This is not limited in this application. The first control subunit and the second control subunit are any two of the plurality of control subunits.

D. One or more automatic gain controllers (AGC) 323 (for example, an AGC 3231 to an AGC 323*m* in FIG. 3*b*).

In an optional example, an input end of each AGC 323 may be coupled to an output end of a corresponding control subunit, and an output end of each AGC 323 may be separately coupled to the input end of the trans-impedance amplifying unit 321 and a gate of each field-effect transistor. For example, an input end of the AGC 3231 is coupled to the output end of the control unit 322, and an output end of the AGC 3231 may be coupled to the input end of the trans-impedance amplifying unit 321 through one path, to adjust a trans-impedance gain of the trans-impedance amplifying unit 321. The output end of the AGC 3231 may be coupled to a gate of the field-effect transistor 3221*b* included in the control subunit 3221 through another path, to adjust a high-frequency peak of the control subunit 3221. It may be understood that the control subunit 3221 is adjusted based on the AGC 3231, and an input signal of the AGC 3231 may be obtained from a signal at any node location behind an output end of the control subunit 3221. In this way, the AGC 3231 may detect voltage at some node locations on the signal path, and further adjust, based on the detected voltage signals, a trans-impedance gain of the trans-impedance amplifying unit, and further adjust a high-frequency peak caused based on the high-frequency inductor.

In another optional example, in the optical receiver, adjusting a trans-impedance gain of the trans-impedance amplifying unit and adjusting a high-frequency peak caused based on the high-frequency inductor may alternatively be separately implemented by different AGCs. For example, in the optical receiver, alternatively, an output end of a first-type AGC may be coupled to the input end of the trans-impedance amplifying unit, to adjust the trans-impedance gain of the trans-impedance amplifying unit. An output end of a second-type AGC is coupled to the gate of the field-effect transistor, to adjust the high-frequency peak caused based on the high-frequency inductor. In addition, an output end of a third-type AGC may be coupled to the input end of the trans-impedance amplifying unit, and may be further coupled to the gate of the field-effect transistor, to adjust the trans-impedance gain of the trans-impedance amplifying unit, and further adjusts the high-frequency peak caused based on the high-frequency inductor. It should be noted that the third-type AGC is mainly used as an example for description in embodiments of this application.

In addition, different AGCs may be configured to control different control subunits. For example, the AGC 3231 in FIG. 3*b* controls the control subunit 3221, and the AGC 323*m* controls the control subunit 322*n*. Alternatively, different AGCs may be configured to control a same control subunit. For example, two or more AGCs may jointly control a same control subunit. Optionally, input signals of different AGCs may be obtained from voltage signals at different nodes on the signal path, to adjust a peak of the control subunit based on features of the voltage signals at the plurality of nodes on the signal path.

It can be learned from FIG. 3*b* that an output signal of the TIA 320 may continue to be transmitted through the next-stage unit 330. It may be understood that the next-stage unit 330 may be any other element, for example, a limiting amplifying unit or another buffer unit, included in the optical receiver 300. This is not limited in this application. In addition, the units/components may alternatively be coupled through one or more other elements on the signal path of the TIA 320. This is not limited in this application either.

In addition, the AGC may receive a single-end signal from the signal path, or may receive a differential signal from the signal path. This is not limited in this application.

Figure 4A:
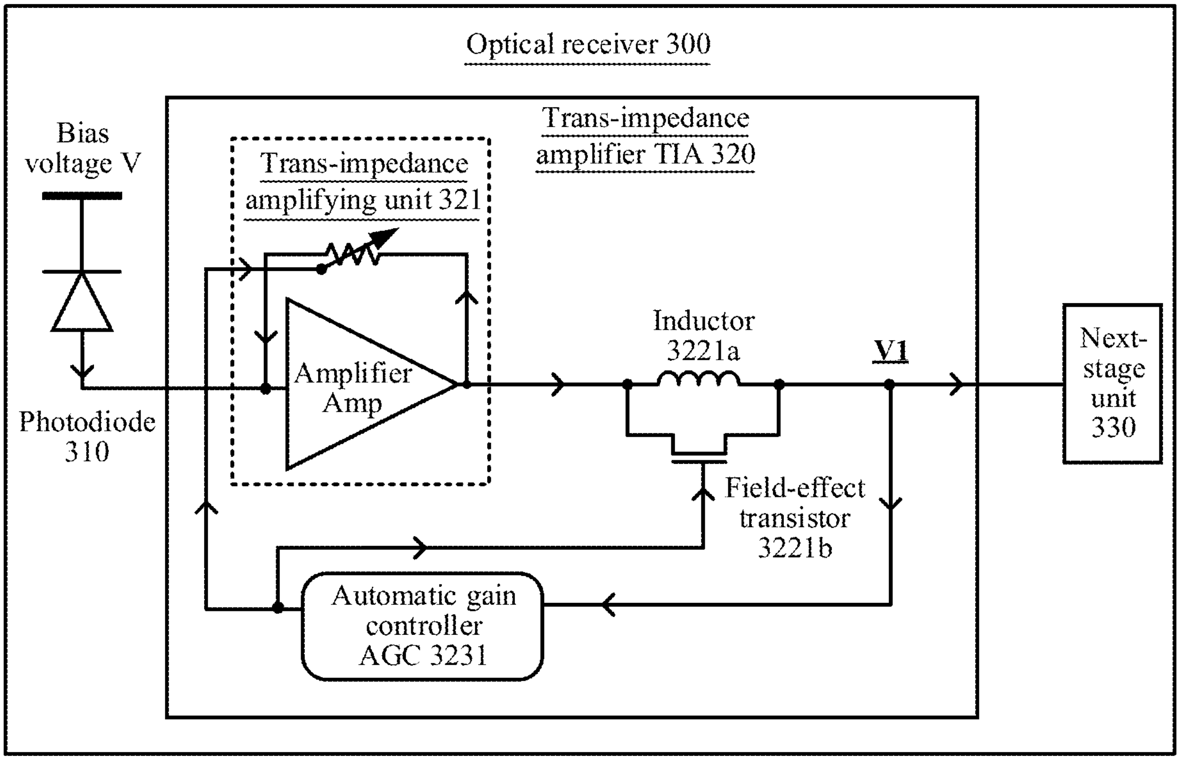
FIG. 4*a* is a second example diagram of an optical receiver according to an embodiment of this application.

In an embodiment, based on the foregoing connection relationships between the elements of the optical receiver, for ease of understanding, the following first uses an example in which the control unit 322 includes one inductor for description. FIG. 4*a* is an example diagram of another optical receiver 300 according to an embodiment of this application. In this example, the input end of the trans-impedance amplifying unit 321 may receive an electrical signal from the photodiode 310, and gain amplification may be performed on the electrical signal at the trans-impedance amplifying unit 321. Then, an input end of the inductor 3221*a* may receive an electrical signal obtained through the gain amplification from the trans-impedance amplifying unit 321, to increase a bandwidth. It may be understood that a coupling manner of the serially coupled inductor 3221*a* and trans-impedance amplifying unit 321 on the signal path may be changed. Details are not described in this application again.

For example, an input signal of the AGC 3231 may be obtained from an output end of the inductor 3221*a*, for example, V1 shown in FIG. 4*a*.

For another example, if the trans-impedance amplifying unit 321 is coupled in series behind the inductor 3221*a*, an input signal of the AGC 3231 may be obtained from the output end of the inductor 3221*a*, and may also be obtained from the output end of the trans-impedance amplifying unit 321.

Figure 4B:
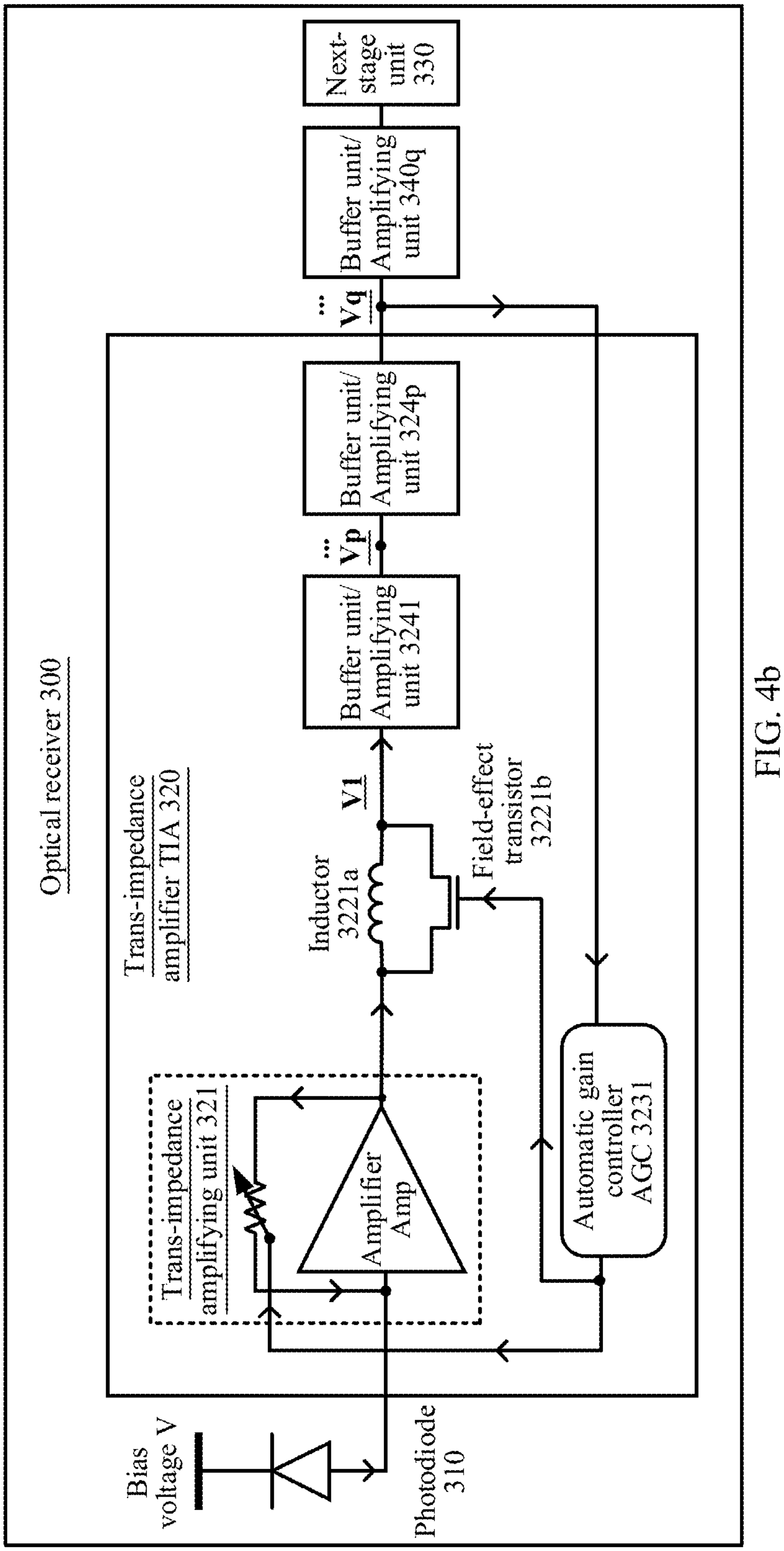
FIG. 4*b* is a third example diagram of an optical receiver according to an embodiment of this application.

In still another optional example, behind the control unit 322, if the optical receiver 300 or the TIA 320 further includes one or a combination of the following components: at least one amplifying unit and at least one buffer unit, where an input signal of the AGC 3231 may alternatively be obtained from an output end of any one of the amplifying units or any one of the buffer units behind the inductor 3221*a*. For example, FIG. 4*b* is an example diagram of another optical receiver 300 according to an embodiment of this application. Assuming that the TIA 320 further includes a buffer unit/amplifier unit 3241 to a buffer unit/amplifier unit 324*p* that are cascaded, an input signal of the AGC 3231 may be any signal obtained from V1 to Vp. Assuming that the optical receiver 300 further includes a buffer unit/amplifier unit 324*p*+1 to a buffer unit/amplifier unit 324*q* that are cascaded, an input signal of the AGC 3231 may alternatively be any signal obtained from Vp+1 to Vq. It may be understood that the AGC 3231 may adjust a high-frequency peak caused based on a high-frequency inductor. Therefore, an input signal of the AGC 3231 may be an electrical signal obtained from any node on the signal path behind a control subunit in which a to-be-adjusted inductor is located.

A working principle of the AGC 3231 may be as follows. When an input signal of the TIA 320 is small, an input signal of the AGC 3231 is also small. In this case, if the input signal of the AGC 3231 does not reach a working signal threshold, the AGC 3231 is in an off state. In other words, the AGC 3231 has not output a voltage signal to the gate of the field-effect transistor 3221*b*. In this case, the field-effect transistor 3221*b* is equivalent to an open circuit, and no peak adjustment needs to be performed on the inductor.

However, as the input signal of the TIA 320 increases, the input signal of the AGC 3231 also gradually increases. In this case, the AGC 3231 starts to work after reaching the working signal threshold. In other words, the AGC 3231 outputs a voltage signal to the gate of the field-effect transistor 3221*b*. In this case, an increase in an input signal of the gate of the field-effect transistor 3221*b* causes a decrease in drain-source resistance of the field-effect transistor 3221*b*. For example, as the drain source resistance decreases to a threshold, a bypass short-circuit effect of the field-effect transistor 3221*b* is gradually caused, so that an electrical signal can be continuously transmitted, with a stronger capability, through a branch circuit in which the field-effect transistor 3221*b* is located, without a need of passing through a branch circuit in which the inductor 3221*a* is located, to avoid resonance, so as to avoid a ringing phenomenon/oscillation phenomenon caused by an effect of the inductor 3221*a* when the input signal of the TIA 320 is overloaded. In addition, when the input signal of the TIA 320 is not overloaded, the field-effect transistor 3221*b* does not affect a bandwidth increase effect that can be originally performed on the electrical signal by the branch circuit in which the inductor 3221*a* is located.

For example, a field-effect transistor included in each control subunit may be an N-channel field-effect transistor (for example, an NFET MOSFET), or may be a P-channel field-effect transistor (for example, a PFET MOSFET).

Optionally, if the field-effect transistor is an N-channel field-effect transistor, a current conduction capability of the N-channel field-effect transistor is negatively correlated to an output voltage signal of the automatic gain controller, as the output voltage signal of the automatic gain controller increases, the current conduction capability of the N-channel field-effect transistor decreases; or as the output voltage signal of the automatic gain controller decreases, the current conduction capability of the N-channel field-effect transistor increases. In this way, when an input signal of the TIA 320 gradually increases and the field-effect transistor 3221*b* starts to work, transmission of an electrical signal on the signal path can gradually change from passing through the inductor 3221*a* to continuously passing through the field-effect transistor 3221*b*. In addition, when the input signal of the TIA 320 gradually decreases, transmission of the electrical signal on the signal path can be gradually restored from passing through the field-effect transistor 3221*b* to continuously passing through the inductor 3221*a*. It may be understood that, in a gradual transmission path change process of the electrical signal, the electrical signal may be transmitted in parallel through the branch circuit in which the inductor 3221*a* is located and the branch circuit in which the field-effect transistor 3221*b* is located.

Optionally, if the field-effect transistor is alternatively a P-channel field-effect transistor, a current conduction capability of the P-channel field-effect transistor is positively correlated to an output voltage signal of the automatic gain controller, as the output voltage signal of the automatic gain controller decreases, the current conduction capability of the P-channel field-effect transistor decreases; or as the output voltage signal of the automatic gain controller increases, the current conduction capability of the P-channel field-effect transistor increases. It may be understood that, because a working principle of the P-channel field-effect transistor is that the current conduction capability is low when a gate signal is low, to transmit an electrical signal through the P-channel field-effect transistor when a signal is overloaded, the automatic gain controller may further include a phase inverter, and a transmission effect that needs to be achieved by the optical receiver in this application may be implemented by using the phase inverter. For an implementation, refer to an implementation process of the N-channel field-effect transistor. Details are not described herein again.

Figure 5A:
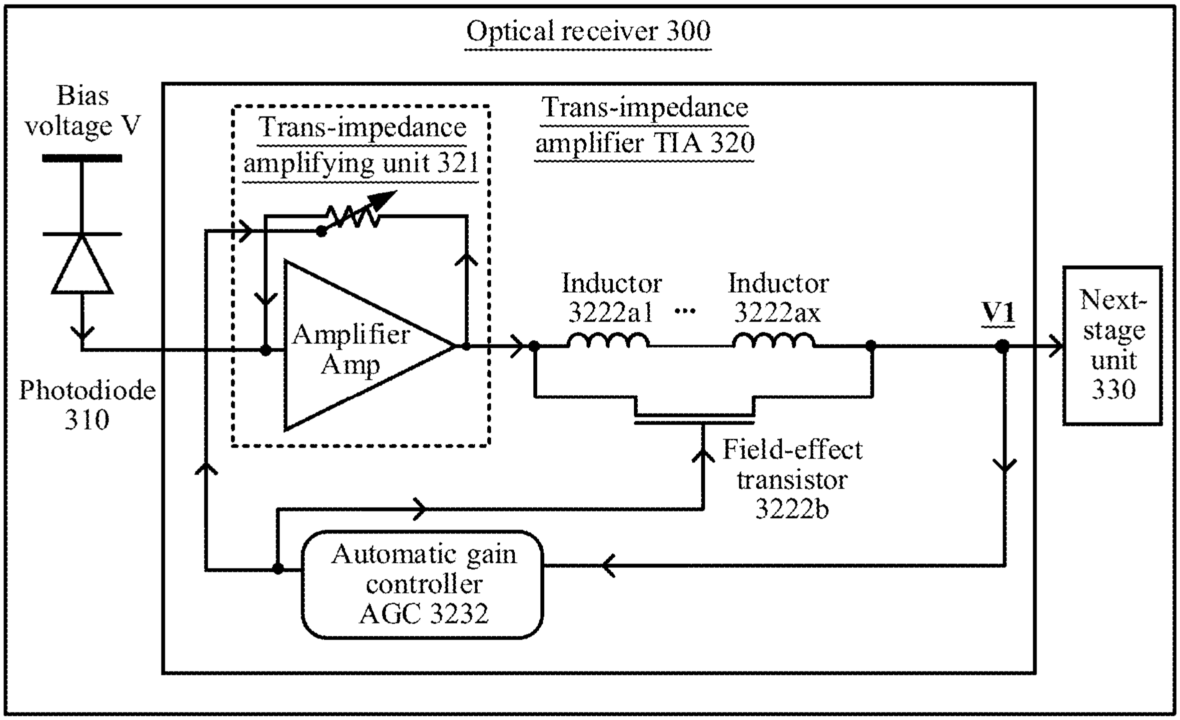
FIG. 5*a* is a fourth example diagram of an optical receiver according to an embodiment of this application.

In another embodiment, based on the foregoing connection relationships between the elements of the optical receiver described above, the control unit 322 may alternatively include a plurality of inductors. FIG. 5*a* is an example diagram of another optical receiver 300 according to an embodiment of this application. In this example, the input end of the trans-impedance amplifying unit 321 may receive an electrical signal from the photodiode 310, and gain amplification may be performed on the electrical signal at the trans-impedance amplifying unit 321. Then, an input end of a cascaded branch circuit of inductors 3222*a*1 to 3222*ax* may receive an electrical signal obtained through the gain amplification from the trans-impedance amplifying unit 321, to implement multi-level bandwidth increasing. It may be understood that a sequence of the inductors 3222*a*1 to 3222*ax* and the trans-impedance amplifying unit 321 may alternatively be exchanged. Details are not described in this application again. In this way, the plurality of stages of inductors may perform joint peak adjustment by using a group of field-effect transistors and an AGC. It may be understood that the electrical signal in this embodiment of this application may include a current signal and a voltage signal. Before the trans-impedance amplifying unit 321, it may be understood that a current signal is transmitted on a signal path, and behind the trans-impedance amplifying unit 321, it may be understood that a voltage signal is transmitted on the signal path.

In addition, an input signal of the AGC 3232 in this embodiment may be obtained from any node location behind an output end of the inductor 3222*ax*. For example, the input signal of AGC 3232 may be obtained from V1 in FIG. 5*a*. For another example, as shown in content in FIG. 5*b*, if the TIA 320/optical receiver 300 further includes one or more buffer units/amplifier units, the input signal of the AGC 3232 may alternatively be any signal obtained from V1 to Vq.

Figure 5B:
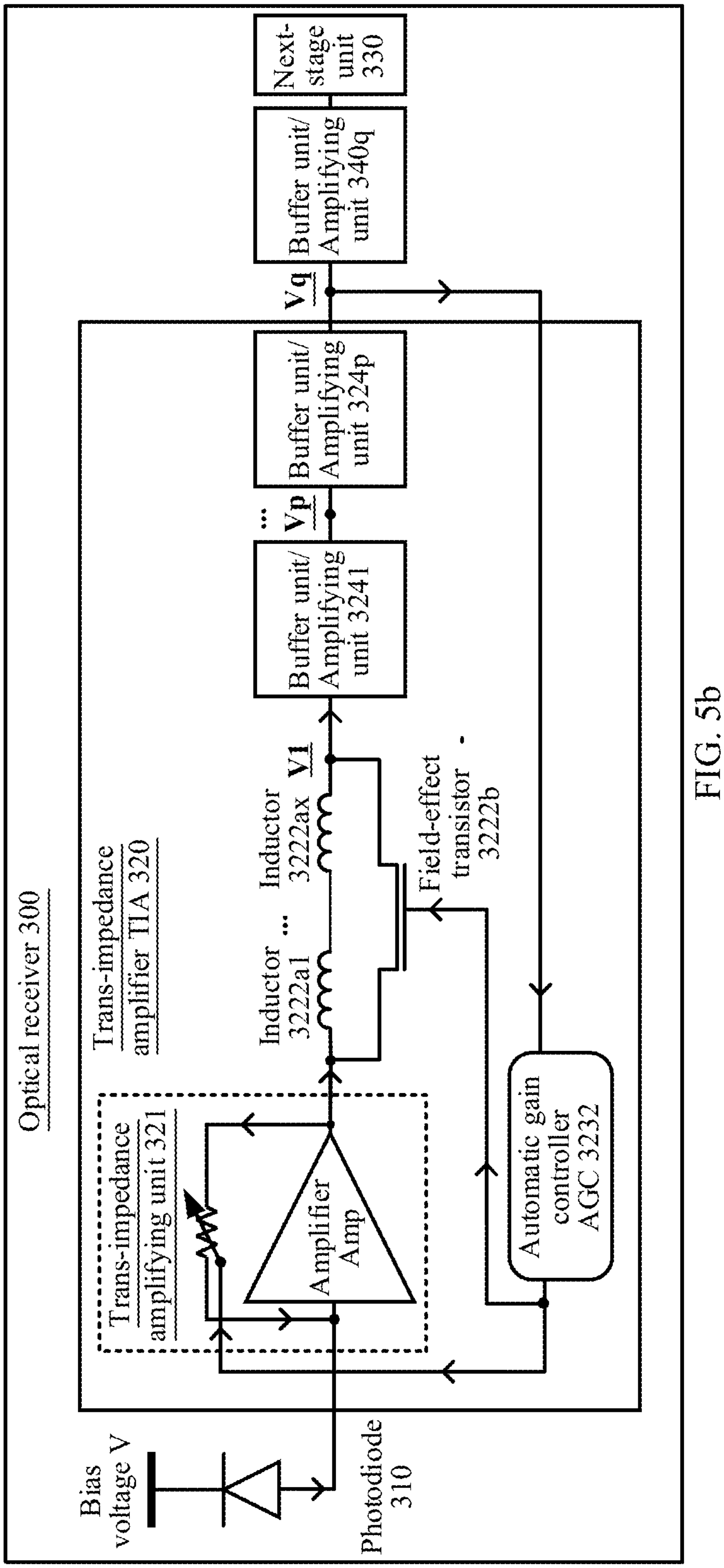
FIG. 5*b* is a fifth example diagram of an optical receiver according to an embodiment of this application.

It may be understood that a working principle of the optical receiver shown in FIG. 5*a* is similar to that in FIG. 4*a*, and a working principle of the optical receiver shown in FIG. 5*b* is similar to that in FIG. 4*b*. For an implementation process, refer to the content described in the foregoing embodiments. Details are not described herein again.

Figure 6A:
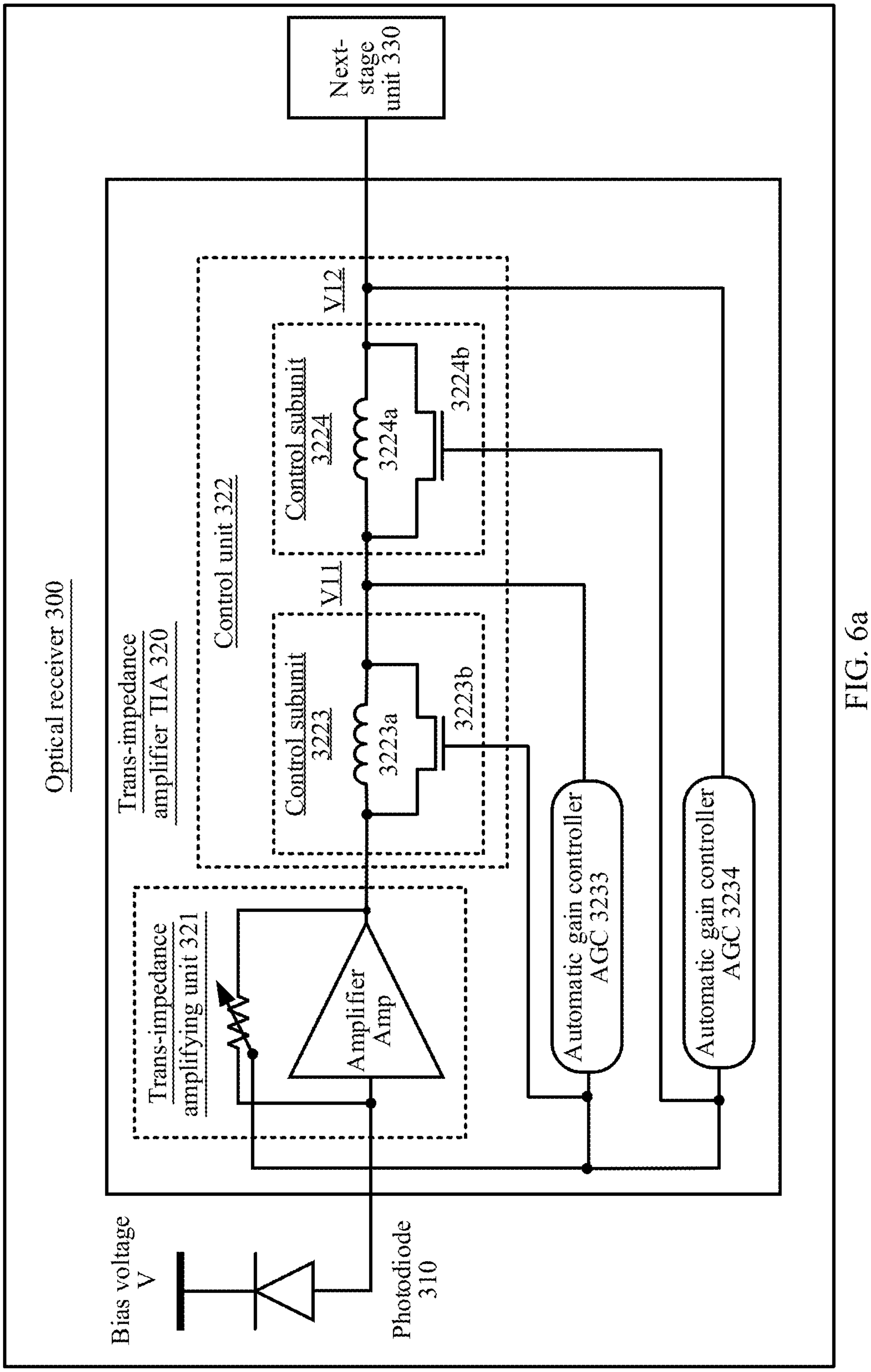
FIG. 6*a* is a sixth example diagram of an optical receiver according to an embodiment of this application.

In still another embodiment, based on the foregoing connection relationships between the elements of the optical receiver, the control unit 322 may further include a plurality of inductors, the plurality of inductors may be divided into at least one sub-branch circuit, and each sub-branch circuit may be connected in parallel to a field-effect transistor. FIG. 6*a* is an example diagram of another optical receiver 300 according to an embodiment of this application. In this example, the input end of the trans-impedance amplifying unit 321 may receive an electrical signal from the photodiode 310, and gain amplification may be performed on the electrical signal at the trans-impedance amplifying unit 321. Then, the inductor 3223*a* and a field-effect transistor 3223*b* may be coupled in parallel, and a gate of the field-effect transistor 3223*b* receives an output voltage signal of an AGC 3233. In addition, an inductor 3224*a* and a field-effect transistor 3224*b* may be coupled in parallel, and a gate of the field-effect transistor 3224*b* receives an output voltage signal of the AGC 3234. In this way, each stage of inductor may perform peak adjustment by using different field-effect transistors and AGCs, to implement precise adjustment.

In addition, in this embodiment, an input signal of the AGC 3233 may be obtained from any node location behind an output end of the inductor 3223*a*, and an input signal of the AGC 3234 may be obtained from any node location behind an output end of the inductor 3224*a*. For example, the input signal of the AGC 3233 may be obtained from V11 in FIG. 6*a*, and the input signal of the AGC 3234 may be obtained from V12 in FIG. 6*a*. For another example, as shown in content in FIG. 6*b*, if the TIA 320/optical receiver 300 further includes one or more buffer units/amplifying units, the input signal of the AGC 3233 may alternatively be any signal obtained from V11 to Vq, and the input signal of the AGC 3234 may alternatively be any signal obtained from V12 to Vq.

Figure 6B:
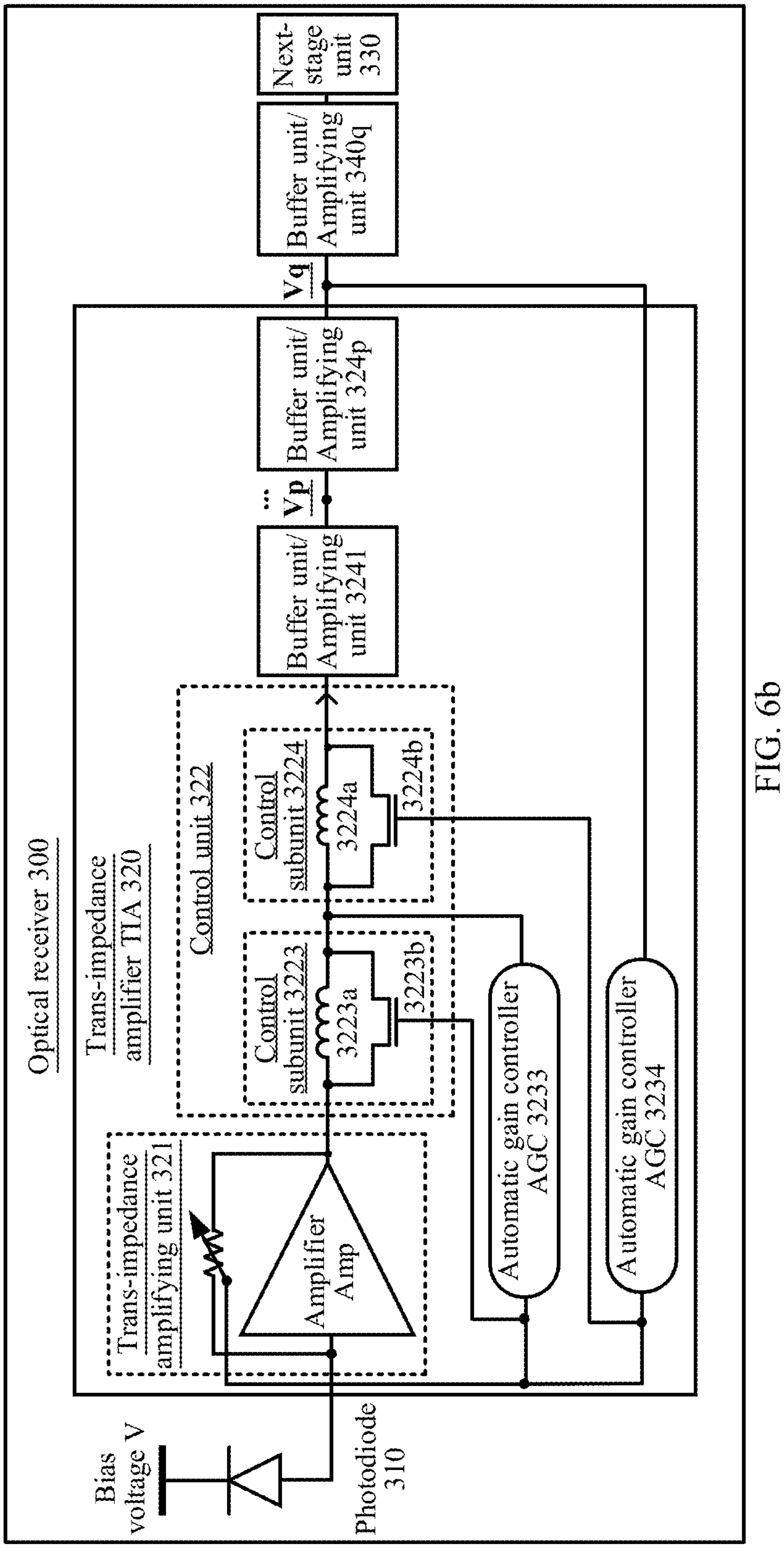
FIG. 6*b* is a seventh example diagram of an optical receiver according to an embodiment of this application.

It may be understood that a working principle of the optical receiver shown in FIG. 6*a* is similar to that in FIG. 4*a*, and a working principle of the optical receiver shown in FIG. 6*b* is similar to that in FIG. 4*b*. For an implementation process, refer to the content described in the foregoing embodiments. Details are not described herein again.

Figure 7A:
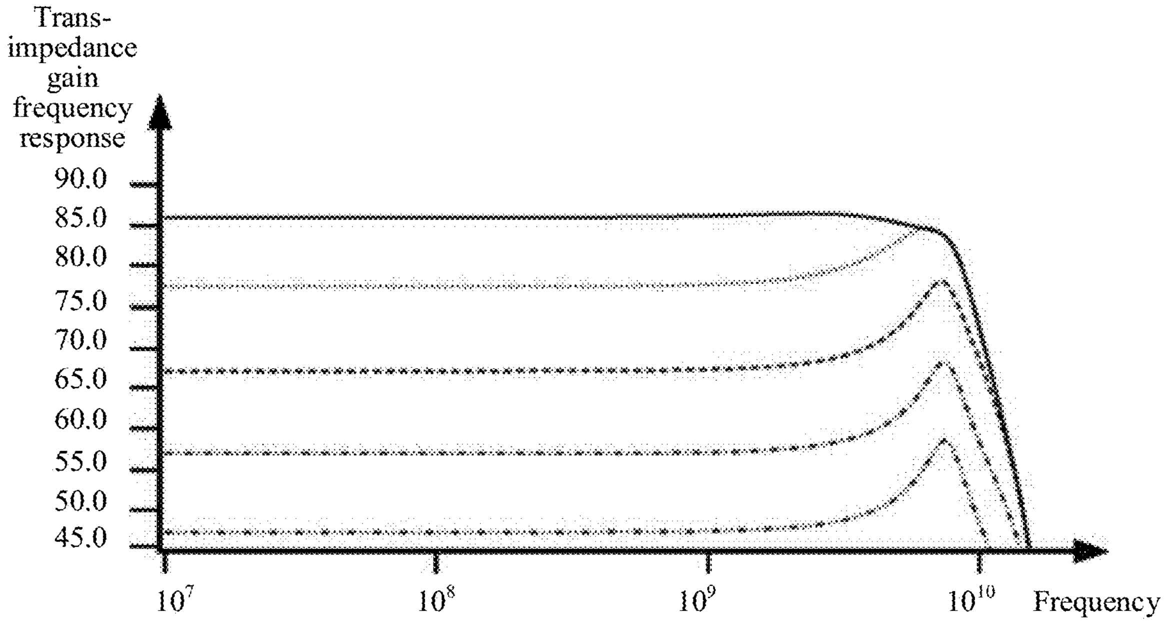
FIG. 7*a* is a signal diagram of an optical receiver according to an embodiment of this application.
Figure 7B:
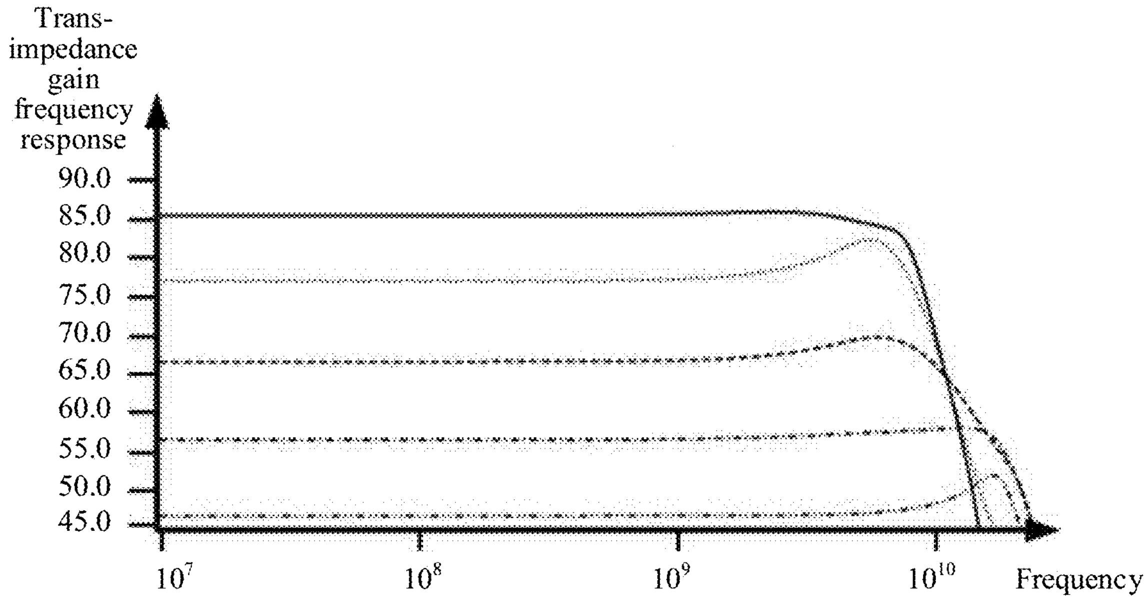
FIG. 7*b* is another signal diagram of an optical receiver according to an embodiment of this application.
Figure 8:
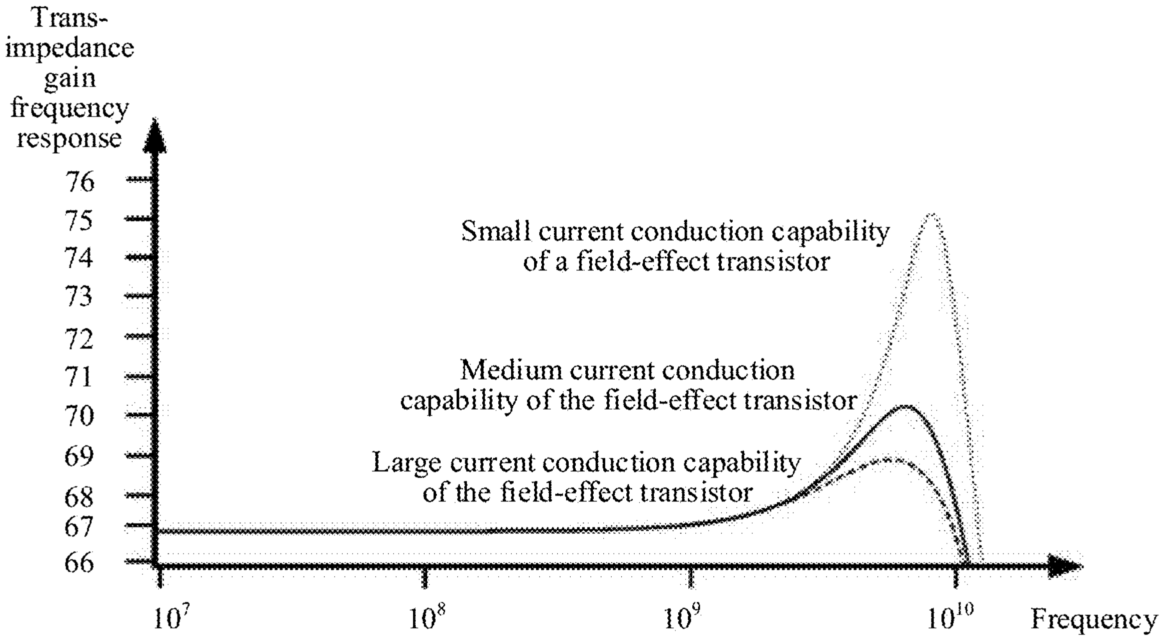
FIG. 8 is still another signal diagram of an optical receiver according to an embodiment of this application.

To better understand receiving performance of the cost-effective-photodetector-based optical receiver provided in embodiments of this application, the following further describes experimental results shown in FIG. 7*a*, FIG. 7*b*, and FIG. 8. FIG. 7*a* is a signal diagram of an optical receiver 300 according to an embodiment of this application. FIG. 7*a* shows a scenario in which an inductor included in an optical receiver is not coupled in parallel to a field-effect transistor. In this scenario, an AGC may reduce a low frequency or a direct current gain on a signal path, but cannot eliminate a high-frequency peak caused by overload of an input signal. For example, in FIG. 7*a*, an excessively large peak amplitude exists near a signal frequency $10^{10}$. FIG. 7*b* shows a scenario in which an inductor included in an optical receiver is coupled in parallel to a field-effect transistor. In this scenario, an output voltage signal of an AGC may change a current conduction capability of the field-effect transistor. When an input signal of a trans-impedance amplifier is large, the AGC may output an output voltage signal that increases a current conduction capability of the field-effect transistor, so that a high-frequency peak caused by input signal overload can be eliminated. For example, in comparison with FIG. 7*a*, a peak amplitude near a signal frequency $10^{10}$ in FIG. 7*b* is reduced.

In addition, FIG. 8 is still another signal diagram of the optical receiver 300 according to an embodiment of this application. FIG. 8 shows statuses of signal trans-impedance gain frequency responses when current conduction capabilities of field-effect transistors are different. Therefore, it can be learned that when the current conduction capability of the field-effect transistor is large, a signal on a signal path is transmitted, with a stronger capability, from a branch circuit in which the field-effect transistor is located, to avoid a high-frequency peak caused by passing through a branch circuit in which an inductor is located. In addition, the field-effect transistor may adjust a peak amplitude of a high-frequency signal without affecting a peak amplitude of a low-frequency signal so that receiving performance of the optical receiver can be ensured.

An embodiment of this application further provides an optical communication device, which may include the optical receiver described in the foregoing embodiments and one or more processors. The one or more processors are configured to receive and process a data packet transmitted from the optical receiver.

It should be noted that in descriptions of this application, "at least one" means one or more, and "a plurality of" means two or more. In view of this, in embodiments of this application, "a plurality of" may alternatively be understood as "at least two". The term "and/or" describes an association relationship for describing associated objects and represents that three relationships may exist. For example, A and/or B may represent the following three cases: only A exists, both A and B exist, and only B exists. In addition, the character "/" generally indicates an "or" relationship between the associated objects. In addition, it should be understood that in descriptions of this application, terms such as "first" and "second" are merely used for distinguishing and description, but should not be understood as indicating or implying relative importance, or should not be understood as indicating or implying a sequence.

It should be noted that "coupling" in embodiments of this application may be understood as an electrical connection, and coupling between two electrical elements may be direct or indirect coupling between the two electrical elements. For example, that A is connected to B may mean that A is directly coupled to B, or mean that A is indirectly coupled to B through one or more other electrical elements. For example, that A is coupled to B may mean that A is directly coupled to C, C is directly coupled to B, and A is coupled to B through C. In some scenarios, "coupling" may also be understood as connection.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, the word "example" is used to represent giving an example, an illustration, or a description. Any embodiment or design solution described as an "example" in this application should not be explained as being more preferred or having more advantages than another embodiment or design solution. Alternatively, it may be understood as that the word "example" is used to present a concept in a particular manner, and does not constitute a limitation on this application.

It may be understood that, in this application, various numeric numbers are distinguished merely for ease of description and are not used to limit the scope of embodiments of this application. The serial numbers of the foregoing processes do not mean execution sequences. The execution sequences of the processes need to be determined based on functions and internal logic of the processes. In addition, the terms "include", "have", and any variant thereof are intended to cover non-exclusive inclusion, for example, include a series of steps or units. For example, a method, system, product, or device is not necessarily limited to those steps or units expressly listed, but may include other steps or units not expressly listed or inherent to such a process, method, product, or device.

Although this application is described with reference to features and embodiments thereof, it is clear that various modifications and combinations may be made to them without departing from the spirit and scope of this application. Correspondingly, this specification and the accompanying drawings are merely example descriptions of solutions defined by the appended claims, and are considered as any or all of modifications, variations, combinations, or equivalents that cover the scope of this application.

Clearly, a person skilled in the art can make various modifications and variations to this application without departing from the spirit and scope of the present disclosure. This application is intended to cover the modifications and variations of embodiments of this application provided that they fall within the scope of protection defined by the following claims and their equivalent technologies.

The invention claimed is:

1. An optical receiver, comprising:
- a photodiode;
- a trans-impedance amplifying unit coupled to the photodiode;
- one or more automatic gain controllers coupled to the trans-impedance amplifying unit; and
- a control unit coupled to the trans-impedance amplifying unit and coupled to the one or more automatic gain controllers, the control unit comprises one or more control subunits, and a control subunit of the one or more control subunits comprises one or more inductors and a field-effect transistor coupled in parallel to the one or more inductors;
  - the trans-impedance amplifying unit and the control unit are coupled in series to form a first branch circuit, and a first branch circuit input end of the first branch circuit receives a photodiode output signal from the photodiode; and
  - an input end of an automatic gain controller of the one or more automatic gain controllers is coupled to a control subunit output end of the control subunit, an output end of the automatic gain controller is coupled to a gate of a corresponding field-effect transistor in the corresponding control subunit, the output end of the automatic gain controller is further coupled to the first branch circuit input end, the automatic gain controller is configured to output a gate output voltage signal to the gate of the corresponding field-effect transistor, and the gate output voltage signal is used to change a current conduction capability of the corresponding field-effect transistor.

2. The optical receiver according to claim 1, wherein the first branch circuit input end of the first branch circuit receives the photodiode output signal from the photodiode, and a first branch circuit output end of the first branch circuit is coupled to an optical receiver output end of the optical receiver, the optical receiver further comprising:
- a trans-impedance amplifying unit input end of the trans-impedance amplifying unit receives the photodiode output signal from the photodiode, and transmits the photodiode output signal to the control unit, wherein the control unit output end of the control unit is coupled to the optical receiver output end; or
- a control unit input end of the control unit receives the photodiode output signal and transmits the photodiode output signal to the trans-impedance amplifying unit, wherein a trans-impedance amplifying unit output end of the trans-impedance amplifying unit is coupled to the optical receiver output end.

3. The optical receiver according to claim 2, wherein the input end of the automatic gain controller is coupled to the control subunit output end of the corresponding control subunit comprises:

if the trans-impedance amplifying unit input end of the trans-impedance amplifying unit receives the photodiode output signal, the input end of the automatic gain controller is coupled to the control subunit output end of the corresponding control subunit; and if the control unit input end of the control unit receives the photodiode output signal from the photodiode, the input end of the automatic gain controller is coupled to the control subunit output end of the corresponding control subunit; or the input end of the automatic gain controller is coupled to the control subunit output end through the trans-impedance amplifying unit.

4. The optical receiver according to claim 1, wherein the optical receiver further comprises a second branch circuit, and the second branch circuit comprises one or a combination of: one or more amplifying units, and one or more buffer units;

wherein a first branch circuit output end of the first branch circuit is coupled to an optical receiver output end of the optical receiver comprises: the first branch circuit output end is coupled to the optical receiver output end through the second branch circuit; and wherein the input end of the automatic gain controller is coupled to a control subunit output end of a corresponding control subunit comprises: the input end of the automatic gain controller is coupled to the control subunit output end of the corresponding control subunit through the one or more amplifying units or the one or more buffer units comprised in the second branch circuit.

5. The optical receiver according to claim 4, wherein:

if the control unit comprises a first control subunit, the one or more inductors comprised in the first control subunit are coupled on a transmission link between the photodiode output end of the photodiode and the optical receiver output end; or the one or more inductors comprised in the first control subunit are coupled inside any one of the amplifying units or any one of the buffer units.

6. The optical receiver according to claim 1, wherein if the field-effect transistor is an N-channel field-effect transistor, a current conduction capability of the N-channel field-effect transistor is negatively correlated with an output voltage signal of the automatic gain controller; or if the field-effect transistor is a P-channel field-effect transistor and the automatic gain controller further comprises a phase inverter, a current conduction capability of the P-channel field-effect transistor is positively correlated with the output voltage signal of the automatic gain controller.

7. The optical receiver according to claim 1, wherein the automatic gain controller receives a single-end signal or a differential signal from any node behind the control subunit output end of the corresponding control subunit.

8. The optical receiver according to claim 1, wherein if the control unit comprises a plurality of control subunits, a quantity of inductors comprised in a first control subunit is the same as or different from a quantity of inductors comprised in a second control subunit, wherein the first control subunit and the second control subunit are any two of the plurality of control subunits.

9. The optical receiver according to claim 1, wherein different automatic gain controllers correspond to different control subunits, or the different automatic gain controllers correspond to a same control subunit.

10. The optical receiver according to claim 9, wherein if different automatic gain controllers correspond to a same control subunit, input ends of the different automatic gain controllers are respectively coupled to different node locations behind an output end of the same control subunit.

11. The optical receiver according to claim 1, wherein an output end of at least one automatic gain controller is further coupled to the trans-impedance amplifying unit input end of the trans-impedance amplifying unit, wherein the automatic gain controller is further configured to adjust a trans-impedance gain of the trans-impedance amplifying unit.

12. The optical receiver according to claim 1, wherein the plurality of control subunits are coupled in series.

13. The optical receiver according to claim 1, wherein the first branch circuit output end of the first branch circuit is coupled to the optical receiver output end.

14. An optical communication device, comprising:

an optical receiver, comprising:

a photodiode;

a trans-impedance amplifying unit coupled to the photodiode;

one or more automatic gain controllers coupled to the trans-impedance amplifying unit; and a control unit coupled to the trans-impedance amplifying unit and coupled to the one or more automatic gain controllers, the control unit comprises one or more control subunits, and a control subunit of the one or more control subunits comprises one or more inductors and a field-effect transistor coupled in parallel to the one or more inductors;

the trans-impedance amplifying unit and the control unit are coupled in series to form a first branch circuit;

a first branch circuit input end of the first branch circuit receives a photodiode output signal from the photodiode;

an input end of an automatic gain controller of the one or more automatic gain controllers is coupled to a control subunit output end of the control subunit, an output end of the automatic gain controller is coupled to a gate of a corresponding field-effect transistor in the corresponding control subunit and the automatic gain controller is configured to output a gate output voltage signal to the gate of the corresponding field-effect transistor; and the gate output voltage signal is used to change a current conduction capability of the corresponding field-effect transistor; and one or more processors coupled to the optical receiver, the one or more processors are configured to receive and process a data packet transmitted from the optical receiver.

15. The optical communication device according to claim 14, wherein the first branch circuit input end of the first branch circuit receives the photodiode output signal from the photodiode, and a first branch circuit output end of the first branch circuit is coupled to an optical receiver output end of the optical receiver, the optical receiver further comprising:

a trans-impedance amplifying unit input end of the trans-impedance amplifying unit receives the photodiode output signal from the photodiode, and transmits the signal to the control unit, wherein the control unit output end is coupled to the optical receiver output end; or a control unit input end of the control unit receives the photodiode output signal and transmits the photodiode output signal to the trans-impedance amplifying unit, wherein an trans-impedance amplifying unit output end of the trans-impedance amplifying unit is coupled to the optical receiver output end.

16. The optical communication device according to claim 15, wherein the input end of the automatic gain controller is coupled to the control subunit output end of the corresponding control subunit comprises:

if the trans-impedance amplifying unit input end of the trans-impedance amplifying unit receives the photodiode output signal, the input end of the automatic gain controller is coupled to the control subunit output end of the corresponding control subunit; and if the control subunit input end of the control unit receives the photodiode output signal, the input end of the automatic gain controller is coupled to the control subunit output end of the corresponding control subunit, or the input end of the automatic gain controller is coupled to the control subunit output end through the trans-impedance amplifying unit.

17. The optical communication device according to claim 14, wherein the optical receiver further comprises a second branch circuit, and the second branch circuit comprises one or a combination of: one or more amplifying units, and one or more buffer units;

wherein a first branch circuit output end of the first branch circuit is coupled to an optical receiver output end of the optical receiver comprises: the first branch circuit output end is coupled to the optical receiver output end of the optical receiver through the second branch circuit; and wherein the input end of the automatic gain controller is coupled to a control subunit output end of a corresponding control subunit comprises: the input end of the automatic gain controller is coupled to the control subunit output end of the corresponding control subunit through the one or more amplifying units or the one or more buffer units comprised in the second branch circuit.

18. The optical communication device according to claim 17, wherein if the control unit comprises a first control subunit, The one or more inductors comprised in the first control subunit are coupled on a transmission link between the photodiode output end of the photodiode and the optical receiver output end; or The one or more inductors comprised in the first control subunit are coupled inside any one of the amplifying units or any one of the buffer units.

19. The optical communication device according to claim 14, wherein if the field-effect transistor is an N-channel field-effect transistor, a current conduction capability of the N-channel field-effect transistor is negatively correlated with an output voltage signal of the automatic gain controller; or if the field-effect transistor is a P-channel field-effect transistor and the automatic gain controller further comprises a phase inverter, a current conduction capability of the P-channel field-effect transistor is positively correlated with the output voltage signal of the automatic gain controller.

20. The optical communication device according to claim 14, wherein the automatic gain controller receives a single-end signal or a differential signal from any node behind the control subunit output end of the corresponding control subunit.

* * * * *